(12) United States Patent
Cornwall et al.

(10) Patent No.: US 7,230,972 B2
(45) Date of Patent: Jun. 12, 2007

(54) METHOD AND SYSTEM FOR COLLECTING AND TRANSMITTING DATA IN A METER READING SYSTEM

(75) Inventors: Mark K. Cornwall, Spokane, WA (US); Jeffrey L. Delamater, Liberty Lake, WA (US)

(73) Assignee: Itron, Inc., Libert Lake, WA (US)

( * ) Notice: Subject to any disclaimer, the term of this patent is extended or adjusted under 35 U.S.C. 154(b) by 232 days.

(21) Appl. No.: 10/838,165

(22) Filed: May 3, 2004

(65) Prior Publication Data

US 2004/0263352 A1    Dec. 30, 2004

Related U.S. Application Data

(60) Provisional application No. 60/468,550, filed on May 7, 2003.

(51) Int. Cl.
*H04B 1/00* (2006.01)
(52) U.S. Cl. .................. 375/134; 375/130; 340/870.02
(58) Field of Classification Search ................ 375/134, 375/130; 340/870.02
See application file for complete search history.

(56) References Cited

U.S. PATENT DOCUMENTS

| | | | |
|---|---|---|---|
| 3,919,640 A | 11/1975 | Simciak | |
| 4,589,075 A | 5/1986 | Buennagel | |
| 5,278,551 A | 1/1994 | Wakatsuki et al. | |
| 5,335,246 A | 8/1994 | Yokev et al. | |
| 5,430,759 A | 7/1995 | Yokev et al. | |
| 5,438,329 A | 8/1995 | Gastouniotis et al. | |
| 5,475,867 A | 12/1995 | Blum | |
| 5,519,387 A | 5/1996 | Besier et al. | |
| 5,631,636 A | 5/1997 | Bane | |
| 5,764,158 A | 6/1998 | Franklin et al. | |
| 5,883,886 A | 3/1999 | Eaton et al. | |
| 5,896,097 A | 4/1999 | Cardozo | |
| 5,914,672 A | 6/1999 | Glorioso et al. | |
| 6,061,453 A | 5/2000 | Bach | |
| 6,069,571 A | 5/2000 | Tell | |
| 6,078,785 A | 6/2000 | Bush | |
| 6,137,423 A | 10/2000 | Glorioso et al. | |
| 6,163,276 A | 12/2000 | Irving et al. | |
| 6,172,616 B1 | 1/2001 | Johnson et al. | |

(Continued)

OTHER PUBLICATIONS

Flyer from Itron, "The Future is Now".

*Primary Examiner*—Timothy Edwards, Jr.
(74) *Attorney, Agent, or Firm*—Patterson, Thuente, Skaar & Christensen, P.A.

(57) ABSTRACT

A method for improving gap coverage in data collection in an automatic meter reading system is disclosed that reduces overall system cost while improving data collection. A transceiver in the system receives data from a plurality of meter modules via encoded reader transmitters (ERTs, or endpoints) and transmits the received data to a central utility database that assigns a unique identification code for each of the meter modules in the system. Data collected via the endpoints is transmitted to the central utility database and correlated with identification codes in the utility database to determine which endpoints did not respond. A data collection error is assigned to the endpoint from which data is not received by the central utility database and a receiver module is then positioned adjacent the endpoint assigned the data collection error to improve data collection.

14 Claims, 4 Drawing Sheets

U.S. PATENT DOCUMENTS

| | | |
|---|---|---|
| 6,195,018 B1 | 2/2001 | Ragle et al. |
| 6,219,655 B1 | 4/2001 | Schleich et al. |
| 6,239,722 B1 | 5/2001 | Colton et al. |
| 6,246,677 B1 | 6/2001 | Nap et al. |
| 6,430,210 B1 * | 8/2002 | McGrath et al. ............ 375/130 |
| 6,671,586 B2 | 12/2003 | Davis et al. |
| 6,710,721 B1 | 3/2004 | Holowick |
| 6,737,985 B1 | 5/2004 | Garrard et al. |
| 6,755,148 B2 | 6/2004 | Holowick |
| 6,934,316 B2 * | 8/2005 | Cornwall et al. ............ 375/134 |
| 2002/0071478 A1 | 6/2002 | Cornwall et al. |
| 2002/0082748 A1 | 6/2002 | Enga et al. |
| 2005/0179561 A1 * | 8/2005 | Osterloh et al. ....... 340/870.02 |

* cited by examiner

METHOD AND SYSTEM FOR COLLECTING AND TRANSMITTING DATA IN A METER READING SYSTEM

RELATED APPLICATIONS

The present application claims the benefit of U.S. Provisional Application No. 60/468,550 filed May 7, 2003, which is incorporated herein in its entirety by reference.

The present invention is related to co-pending application assigned to the assignee of the present invention and entitled "Spread Spectrum Meter Reading System Utilizing Low-Speed/High Power Frequency Hopping," filed Jul. 23, 2001, Ser. No. 09/911,840 the disclosure of which is hereby incorporated by reference in its entirety.

FIELD OF THE INVENTION

The present invention relates to a method and system for collecting data from remote utility meters and, more particularly, to method and a system for improving coverage of an automated meter reading system without substantially increasing the cost of the overall system.

BACKGROUND OF THE INVENTION

Wireless automatic meter reading (AMR) systems are well known. Typically, each utility meter is provided with a battery-powered encoder that collects meter readings and periodically transmits those readings over a wireless network to a central station. The power limitations imposed by the need for the encoder to be battery powered and by regulations governing radio transmissions effectively prevent direct radio transmissions to the central station. Instead, wireless AMR systems typically utilize a layered network of overlapping intermediate receiving stations that receive transmissions from a group of meter encoders and forward those messages on to the next higher layer in the network as described, for example, in U.S. Pat. No. 5,056,107. These types of layered wireless transmission networks allow for the use of lower power, unlicensed wireless transmitters in the thousands of end point encoder transmitters that must be deployed as part of a utility AMR system for a large metropolitan area.

In 1985, as an attempt to stimulate the production and use of wireless network products, the FCC modified Part 15 of the radio spectrum regulation, which governs unlicensed devices. The modification authorized wireless network products to operate in the industrial, scientific, and medical (ISM) bands using spread spectrum modulation. The ISM frequencies that may be used include 902 to 928 MHz, 2.4 to 2.4835 GHz, and 5.725 to 5.850 GHz. The FCC allows users to operate spread spectrum wireless products, such as utility metering systems, without obtaining FCC licenses if the products meet certain requirements. This deregulation of the frequency spectrum eliminates the need for the user organizations to perform costly and time-consuming frequency planning to coordinate radio installations that will avoid interference with existing radio systems.

Synchronization between a transmitter and a receiver in an AMR system can be accomplished by using an encoded preamble at the beginning of each transmission. A correlator is then used to synchronize an incoming sampled data stream with a known sync pattern once a phasing arrangement partitions the sampled data stream into a first and second sampled sequences. In a wireless meter reading system, for example, where cost and battery power are central concerns, undesirable consequences of stabilization circuitry can erect a significant manufacturing and system design barrier.

One challenge faced by designers of wireless meter reading systems involves providing adequate coverage with transceivers located in the field that are receiving data from metering units that will be transmitted back to the utility. Current meter reading systems use high sensitivity receivers placed on utility poles to read as many meter modules as possible. These receivers are expensive and therefore must cover a large area. Signal multipathing and attenuation due to buildings, fences, and other structures cause holes in the coverage area. In order to fill these holes, additional receivers have to be placed in the coverage area, increasing the cost of the system. In addition, the radio frequency (RF) link becomes marginal for some modules, requiring more intermediate receivers to be placed for redundancy. A goal in designing these systems is to achieve a balance of coverage and hardware invested in the meter reading system.

Another challenge faced by utilities is the implementation and management of energy-saving load shedding programs. The lack of access to real-time data on the amount of actual energy still being used once load-shedding commands are sent to an electrical load is a typical problem encountered in load shedding program execution. Utilities have no way of knowing if a load shedding command, sent to a designated home or industrial location, has been overridden by the customer. In this example, the utility has no real-time data as to how much energy is actually being preserved in spite of the implementation of load shedding programs.

Accordingly, there is a need for a system for collecting data from meter modules located in a wide area that has a high degree of accuracy and reliability. An approach that addresses the aforementioned problems, as well as other related problems, is therefore desirable.

SUMMARY OF THE INVENTION

According to one aspect of the invention, there is disclosed an AMR system and a method for improving gap coverage in data collection in an AMR system. The meter reading system has at least one transceiver that receives data from a plurality of meter modules via encoded receiver transmitter (ERTs, or endpoints) and transmits the received data to a central utility database, wherein the central utility database includes a unique identification code for each of the meter modules in the system. The gap coverage method comprises transmitting data collected via the endpoints to the central utility database and correlating the data received from the endpoints with the identification codes in the utility database to determine which, if any, endpoints did not respond. A data collection error is assigned to any endpoint from which data is not received by the central utility database and a receiver module is then positioned adjacent to the endpoint(s) assigned the data collection error. In this example embodiment, the receiver module is comprised of a filter, and an amplifier coupled to filter stages feeding a diode detector, wherein the receiver module omits a local oscillator and a mixer. In a related embodiment, the receiver is configured to receive and decode frequency-modulated signals.

According to another aspect of the invention, there is disclosed a method for generating feedback to a central utility station performing selective load-shedding of a plurality of electrical loads, wherein each of the electrical loads connected to a meter module measures the electricity consumed by the electrical load. A load-shed command is sent to at least one of the electrical loads to transition from a first state to a second state. In response to the load shed command, there is stored electricity consumption data of the electrical load in the first state and a transition of the electrical load to the second state is initiated. Electricity consumption data is received from the meter module connected to the electrical load and then electricity consumption data of the first state is compared with the electricity consumption data received post initiation of the load-shed command. Electricity consumption data of the second state of the electrical load is stored, where the electricity consumption post initiation is less than the first state electricity consumption data. The second state electricity consumption data is then sent to the central utility station, thereby indicating that the electrical load is in the second state and confirming the load-shed command.

According to yet another aspect of the invention, there is disclosed a method of collecting data in an AMR system having a plurality of meter modules that transmit the data to a central utility database. A receiver module receives a radio frequency signal from at least one of the meter modules disposed adjacent the receiver module and decodes the received radio frequency signal using a correlating technique to find a signal preamble. A data packet within the received radio frequency signal is then decoded using a received signal strength indicator (RSSI) decoding technique. A data transfer is then initiated from the receiver module to the central utility database by transmitting decoded data from the receiver module to the central utility database via a communications network. In a related embodiment, the received signal is a frequency-modulated signal; a data packet within the received signal is decoded using other digital signal processor implemented correlator techniques.

Various embodiments of the invention are directed to addressing various needs in connection with ensuring full coverage and receiving load-shedding feedback using a wireless AMR system.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE INVENTION

The invention is generally directed to a method and a system for collecting data from meter modules that are not read by a corresponding transceiver that is configured to read all of the meter modules in a designated area, wherein the transceiver is assigned by the central utility to the designated area. While the invention is not necessarily limited to such an application, the invention will be better appreciated using a discussion of example embodiments in such a specific context.

In one example embodiment, a system for generating feedback to a central utility station performing selective load shedding of a plurality of electrical loads is disclosed, wherein each of the electrical loads is connected to a meter module adapted to measure the electricity consumed by the electrical load. The system includes a plurality of encoded reader transmitters (ERTs, or endpoints), each associated with a meter module, and at least one receiver module adapted to be communicatively connected to the central utility station and to at least one of the electrical loads via at least one endpoint. The receiver module is associated with at least one electrical load and is adapted to execute a load shed command received from the central utility station. The receiver module also receives consumption data from the meter module post execution of the load shed command and transmits the post execution consumption data to the central utility station.

In another example embodiment, a low-cost receiver (LCR) is placed in close proximity to a meter module for receiving the information; the lower the cost of the receiver the more receivers that can be distributed to improve the coverage area and the reliability read for local modules. Since the modules will be relatively close to the LCR, high sensitivity is not required. The LCR of the invention is comprised of a filter electrically coupled to an amplifier and filter stages feeding a simple diode detector. The diode detector in turn is electrically coupled to a post-detection filter. This approach effectively eliminates the need for the local oscillator and mixer in most current radio designs, thereby substantially reducing the cost of the receiver. In one application the cost of the RF front end is about one-tenth the cost of the regular transceiver. The demodulated signal is then fed to an A/D converter that is coupled to a low-cost digital signal processor (DSP). The DSP decodes the signal using correlation techniques to find the endpoint's preamble and uses RSSI decoding techniques to decode the signal's data packet. A DSP is only one example of many microcontrollers that can be used.

In one application, the receiver is a wide band receiver that is configured to operate without a wake up transmitter. In such a system, the endpoint modules are configured to be bubble-up only modules. If the modules were to be used in a fixed network type installation they could bubble at a slow rate, which would preserve battery life. In a related application, the input of the receiver is closely coupled to power lines, which allows the use of house wiring as an antenna. While it is not appropriate to intentionally put RF energy onto power lines, such energy can nonetheless be recovered. Since there are no oscillators running in the RF front end of the receiver module there is no need to keep the receiver module off of the power lines. In addition, where a wake up transmitter is not used in connection with the receiver module there is no RF energy to couple to the power lines. The receiver is mountable in a collar behind the meter, in a box mounted near the breaker panel, or is configurable to be a module the size of a circuit breaker that snaps into a breaker panel. Mounting close to the electric endpoint and using the house wiring as an antenna would result in very close coupling between the receiver module and the endpoint.

Figure 1:
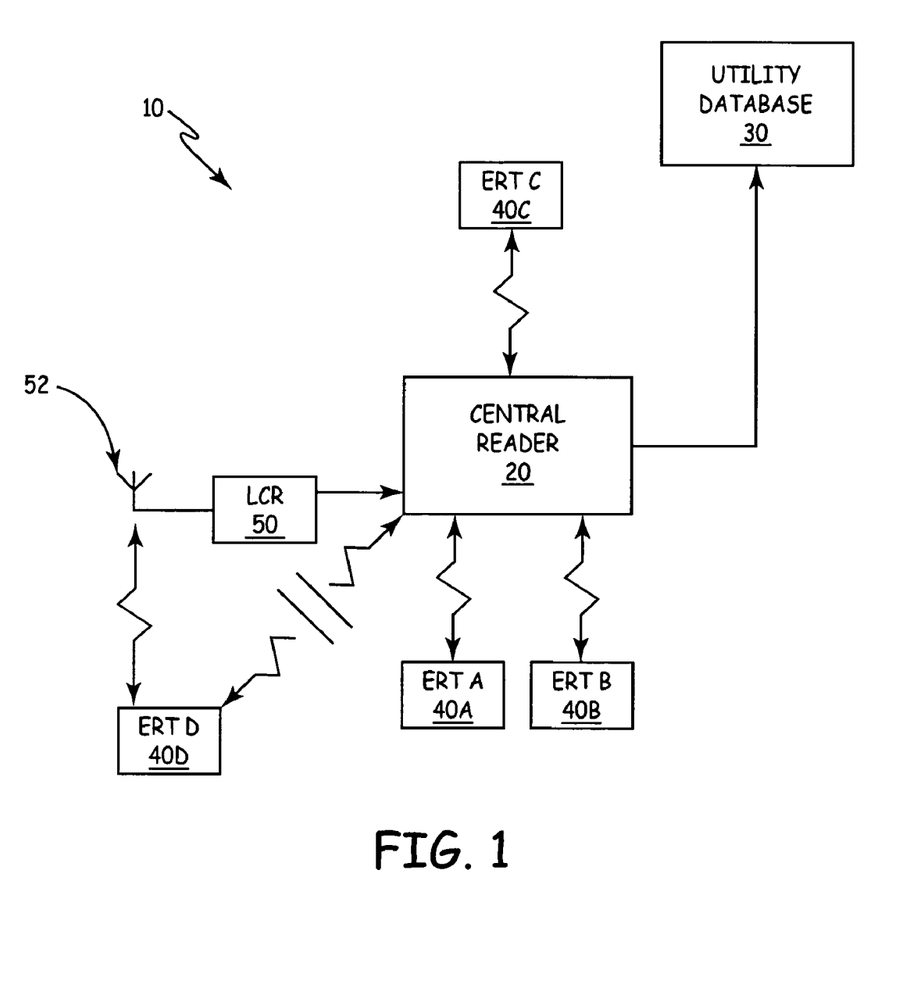
FIG. 1 illustrates a wireless meter reading system that addresses a gap-coverage deficiency according to one embodiment of the invention.
Figure 2:
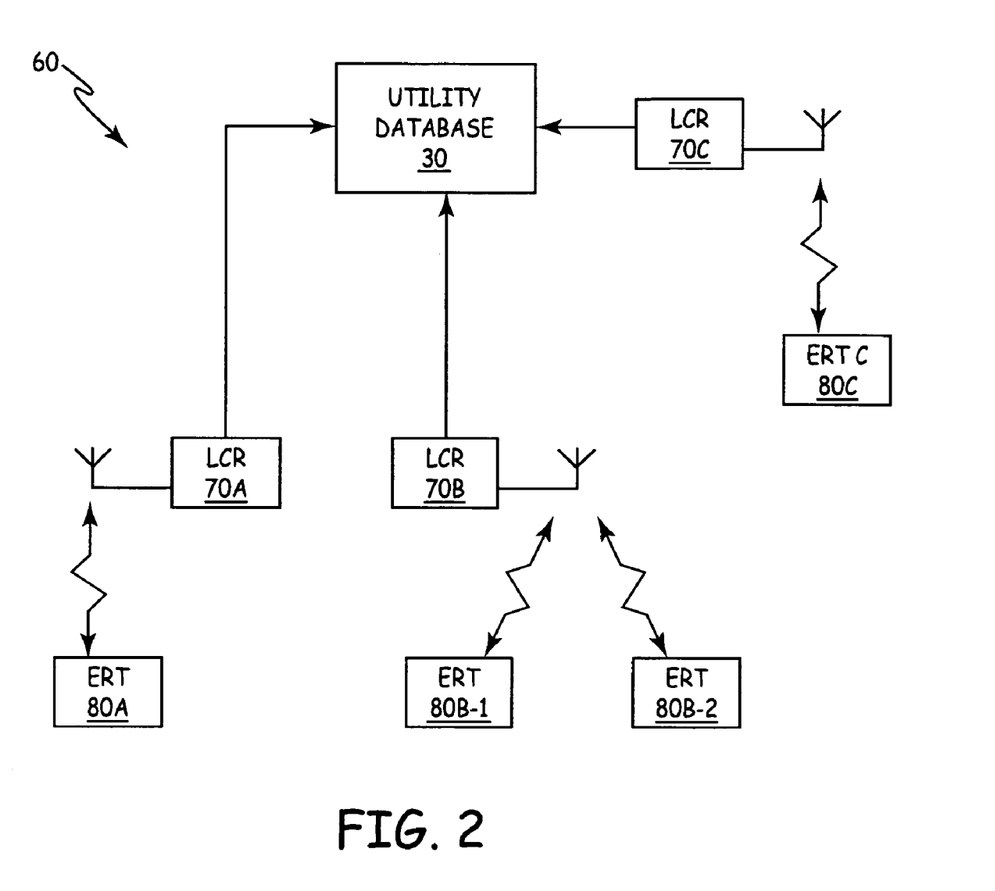
FIG. 2 illustrates a wireless meter reading system with improved gap-coverage and that is usable in a load-shedding system.

Referring now to FIGS. 1 and 2, there are illustrated two approaches to using the receiver module of the invention to provide gap-coverage in a system having a transceiver (FIG. 1) and to substitute for the transceiver and communicate directly with the central utility station (FIG. 2), respectively. In this example embodiment of an AMR system 10, there is included a central reader or transceiver 20 that is communicatively coupled to a utility database 30 at a central utility station. AMR system 10 also includes a plurality of endpoints 40A–40C that transmit consumption data from utility meters in the field to transceiver 20. AMR system 10 further includes a low cost receiver (LCR) module 50 with an antenna 52 that is positioned adjacent an endpoint 40D that is failing to have its data transmitted to the central utility station.

In this example embodiment, there is also disclosed a method for improving gap coverage in data collection in an AMR system that has at least one transceiver that receives data from a plurality of meter modules via endpoints. Transceiver 20 transmits consumption data to a utility station having central utility database 30, database 30 being configured to store a unique identification code for each of the meter modules (and/or endpoints) in the system 10. Consumption data that is collected by the individual endpoints 40A–40D is first transmitted to central utility database 30 via transceiver 20. The consumption data associated with each meter module 40A–40D is correlated with the identification codes in utility database 30 and a determination is then made as to which endpoints 40A–40D, if any, did not respond (i.e., no consumption data was received by the central utility database 30). A data collection error is then assigned to the endpoint 40D, for example, from which data was not received by a central utility server managing database 30. To fill the gap in data collection coverage, a low cost receiver (LCR) module 50 is positioned adjacent to endpoint 40D assigned the data collection error and LCR 50 transmits the data received from the endpoint 40D to transceiver 20. In this example embodiment, LCR 50 is comprised of a filter followed by an amplifier coupled to filter stages feeding a diode detector. The receiver module 50 can omit a local oscillator and a mixer due to its proximity to the endpoint 40D.

Referring now to FIG. 2, there is illustrated a wireless meter reading system 60 with improved gap-coverage capability that is usable by a utility in a load-shedding system. In one example embodiment, system 60 includes utility database 30 that stores identification data of the meter modules and of endpoints 80A, 80B1–80B2 and 80C in the system 60. Improved gap coverage is obtained by substituting the main transceiver with the LCR modules of the invention. In particular, LCR 70A transmits consumption data received by endpoint 80A directly to utility database 30, while LCR 70B transmits consumption data received by endpoints 80BI and 80B2, and LCR 70C transmits consumption data received by endpoint 80C directly to utility database 30, respectively.

The LCRs 70A–70C can transmit the consumption data via a wired or a wireless network to the utility server running database 30. In a wireless network embodiment, for example, the transmitted signals can be amplitude modulated signals or frequency modulated signals, depending on the system and the LCR 70A–70C configuration. LCR 70A–70C embodiments are described in further detail below, with reference to FIGS. 3 and 4.

In a related embodiment, system 60 generates feedback to a central utility station 30 performing selective load-shedding of a plurality of electrical loads connected to a meter module. Endpoints 80A–80C are each associated with a corresponding meter module while at least one LCR 70A, for example, is adapted to be communicatively coupled to the central utility station 30. LCRs 70A–70C associated with the electrical load are each configured to execute a load-shed command received from the central utility station 30 and to receive consumption data from the meter module post-execution of the load shed command. LCRs 70A–70C are adapted to transmit the post-execution consumption data to the central utility station 30.

In this example, LCR 70A cooperates with the utility station 30 to perform load-shedding activities in a closed loop manner. In particular, a load-shed command is sent to at least one of the electrical loads to transition from a first state (e.g., running at full power) to a second state (e.g., running at reduced power). In response to the load shed command, electricity consumption data of the electrical load in the first state is stored and a transition of the electrical load to the second state is initiated. Consumption data from the meter module connected to the electrical load is received by LCRs 70A–70C and consumption data of the first state is compared with consumption data received post initiation of the load-shed command. Consumption data of the second state of the electrical load is then stored, where the consumption post load-shed initiation is less than the first state consumption data. The second state consumption data is then transmitted to the central utility station 30, thereby indicating that the electrical load is in the second state and confirming the load-shed command. In another application, the second state for the load is to have the load shut off or taken off line.

In another related embodiment, there is disclosed a method of collecting data in an AMR system having a plurality of meter modules and transmitting the data to a central utility database. The method comprises receiving via an LCR a radio frequency signal from at least one of the meter modules disposed adjacent the LCR and decoding the received radio frequency signal via a correlating technique to find a signal preamble. A data packet within the received radio frequency signal is decoded via a received signal strength indicator (RSSI) decoding technique and then a data transfer is initiated from the receiver module to the central utility database. The data transfer includes transmitting decoded data from the receiver module to the central utility database via a communications network.

In a related embodiment, a local receiver behaving as a virtual endpoint would act as a two-way endpoint for any of the endpoints that are in its domain. The receiver would only receive the standard endpoint packet but could be configured to work as a demand meter for advanced meter functionality. The radio, or "Home Gateway," module could perform two-way functions such as disconnects and monitor the effects of load shedding. This would allow a migration path for existing installations. The next-generation infrastructure could be developed from the radio up to a central utility station while today's endpoints continue to be deployed because the modules are low power devices and do not create interference with adjacent installations.

The next requirement is to get the data out of the LCR, which could be done using a "Home Gateway" by calling out on the telephone. Another method of accessing the data uses standard wide area network solutions such as the 802.11 standard or Bluetooth; a proprietary RF link could also be developed for this purpose. This link would be a high power two-way link to a device like a high-powered transceiver. A cellular digital packet data (CDPD) modem could also be used directly from the receiver module. Where the "Home Gateway" approach is used, remote load switching modules can be controlled via a power line carrier, a short haul RF link, or a direct connection. Because the radio could be closely coupled to the electric endpoint, highly reliable reads are attainable. Where readability of the electric endpoint is guaranteed, the reader could implement a virtual demand meter; the demand reset can then occur in the radio module. If the electric endpoint is a 41 series endpoint bubbling at a one second rate, for example, then the time accuracy would be within one or two seconds.

Figure 3:
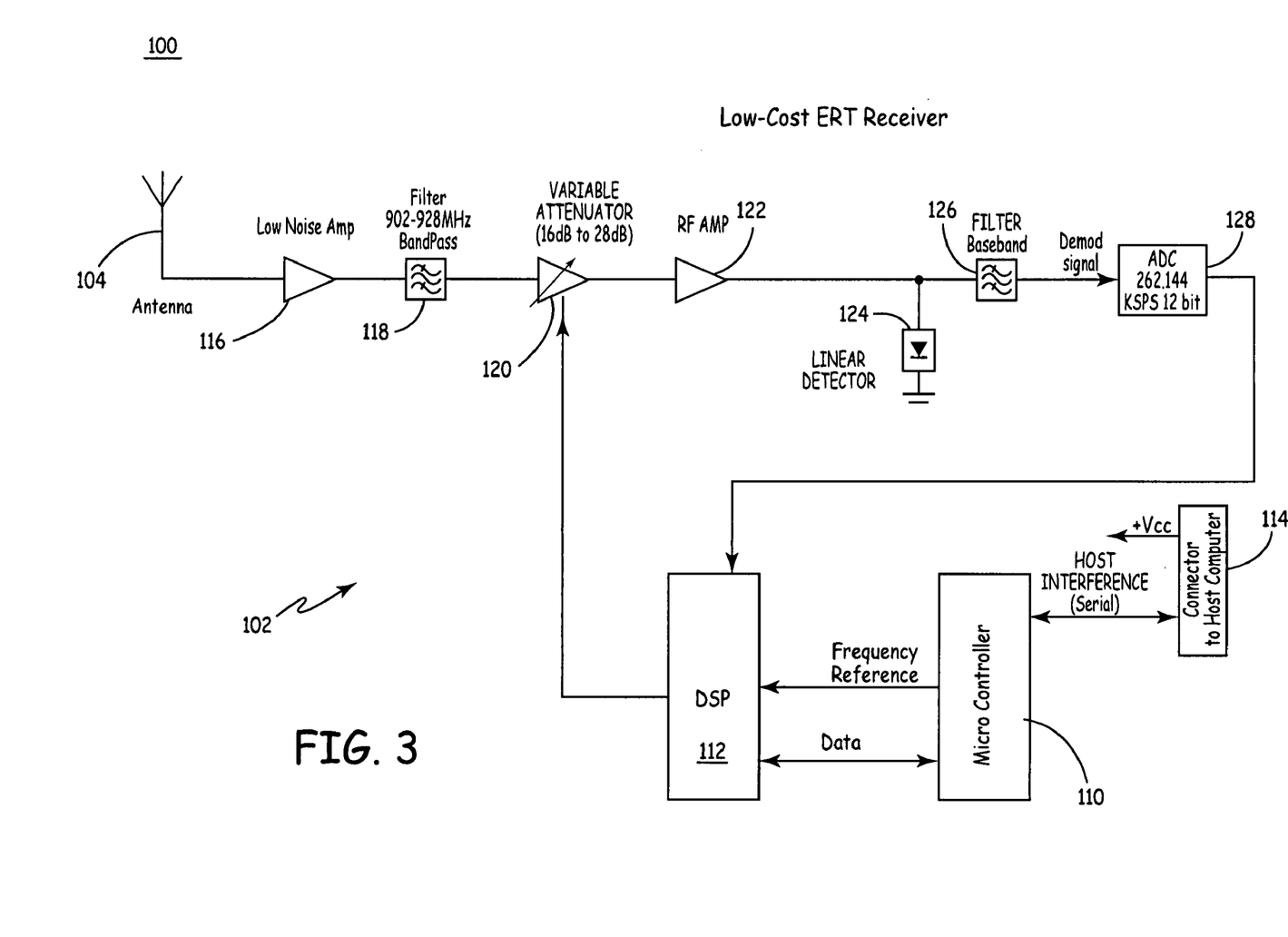
FIG. 3 is a basic schematic diagram of a front end of a low cost receiver module according to one embodiment of the invention.

Referring now to FIG. 3, there is illustrated a basic schematic diagram of a front end of an LCR module 100 according to one embodiment of the invention. A receiver board 102 is used to receive the modulated signals, which in this example are the frequency hopping spread spectrum (FHSS) signals, through an antenna 104. Receiver module 100 includes a microcontroller 110, such as an 8051 microcontroller, and a signal processor 112, preferably a digital signal processor (DSP). Controller 110 directs data and commands to and from DSP 112 and host computer interface 114. As understood by persons skilled in the relevant arts, the host computer interface 114 is arranged to communicate with a host computer, such as, for example, a portable or mobile AMR system data collector. As is well known in the art, communications with the host computer can include the transfer of utility meter consumption and related data received by LCR module 100, as well as configuration information or instructions. Referring again to the embodiment illustrated in FIG. 3, DSP 112 is preferably a DSP chip from TEXAS INSTRUMENTS, although other compatible DSP chips known to those skilled in the art can also be used. DSP 112 is the mathematical calculator for the correlator and decoder, which switches in and out the attenuation of the front-end amplifier. As understood by persons skilled in the relevant arts, a variable attenuator facilitates selectively adjusting the sensitivity of the LCR module 100 front end. When receiving signals from a nearby utility meter endpoint, a reduced sensitivity can be selected to prevent the received signal from saturating circuitry that follows the variable attenuator (such as RF amplifier 122), and to suppress interfering noise. Conversely, when receiving signals from a distant endpoint, an increased sensitivity may be desirable. In the embodiment illustrated in FIG. 3, the sensitivity setting of variable attenuator 120 is controlled by a feedback signal from DSP 112. Receiver 100 implements a low noise amplifier 116 electrically coupled to a filter 118 that is in turn electrically coupled to a variable attenuator 120 followed by an RF amplifier 122. This configuration brings incoming endpoint packets to the decoder. For a moderate additional cost the circuit 100 can include an FFT engine.

In previous FHSS meter reading systems of the assignee Itron, Inc., the receiver was designed to sample bit sliced data from the detector output to look for endpoint packets. Receiver 102 also samples the output of the detector but without bit slicing the data. The preamble of the endpoint packet is always the same, that is, receiver 102 knows what to look for to see the start of a packet. This allows the receiver to use correlation techniques, as preferably implemented by a correlator. In accordance with one embodiment of the invention, a correlator comprises a circuit, or a processor or controller, programmed to compare the incoming stream of bits to the known values as designated in the message. In the embodiment shown in FIG. 3, the correlator is implemented in DSP 112. The correlator gives low values of correlation until an ongoing (preferably over approximately twenty bits) match is perceived. In this case, the correlator output becomes very high. Therefore, in this embodiment of the invention, there is no guessing whether the data packet is a valid endpoint packet because the correlator enables the receiver 100 to know whether the data packet is a valid endpoint packet (within the statistical probability of a false match). Further, the receiver 100 has an accurate timing of the packet bit stream, allowing it to decode the remaining portions of the data packet in the center of each bit, which increases the number of cleanly decoded packets. With a correlator implemented as described, the receiver 100 can actually detect the presence of a valid packet below the base level of noise (commonly referred to as looking into the noise).

As depicted in FIG. 3. LCR 100 also comprises a linear (diode) detector 124 electrically coupled to a filter 126 and an analog-to-digital (A/D) converter 128 that feeds DSP 112. As understood by persons skilled in the relevant arts, linear detector 124 can operate as an envelope detector for extracting the baseband (i.e. modulating) signal from an amplitude modulated (AM) signal. As described above, this type of arrangement makes it possible to omit a local oscillator and mixer, thereby substantially reducing the cost of the AMR receiver. In a related embodiment, linear detector 124 is omitted and AID converter 128 comprises a high-speed A/D converter so as to enable LCR 100 to receive and decode frequency-modulated signals.

In yet another related embodiment, a low cost receiver is configured to provide the same functionality of LCR 100 while omitting the connection to a host computer and eliminating the need for a microcontroller (such as microcontroller 110) and the need for host computer 114.

Figure 4:
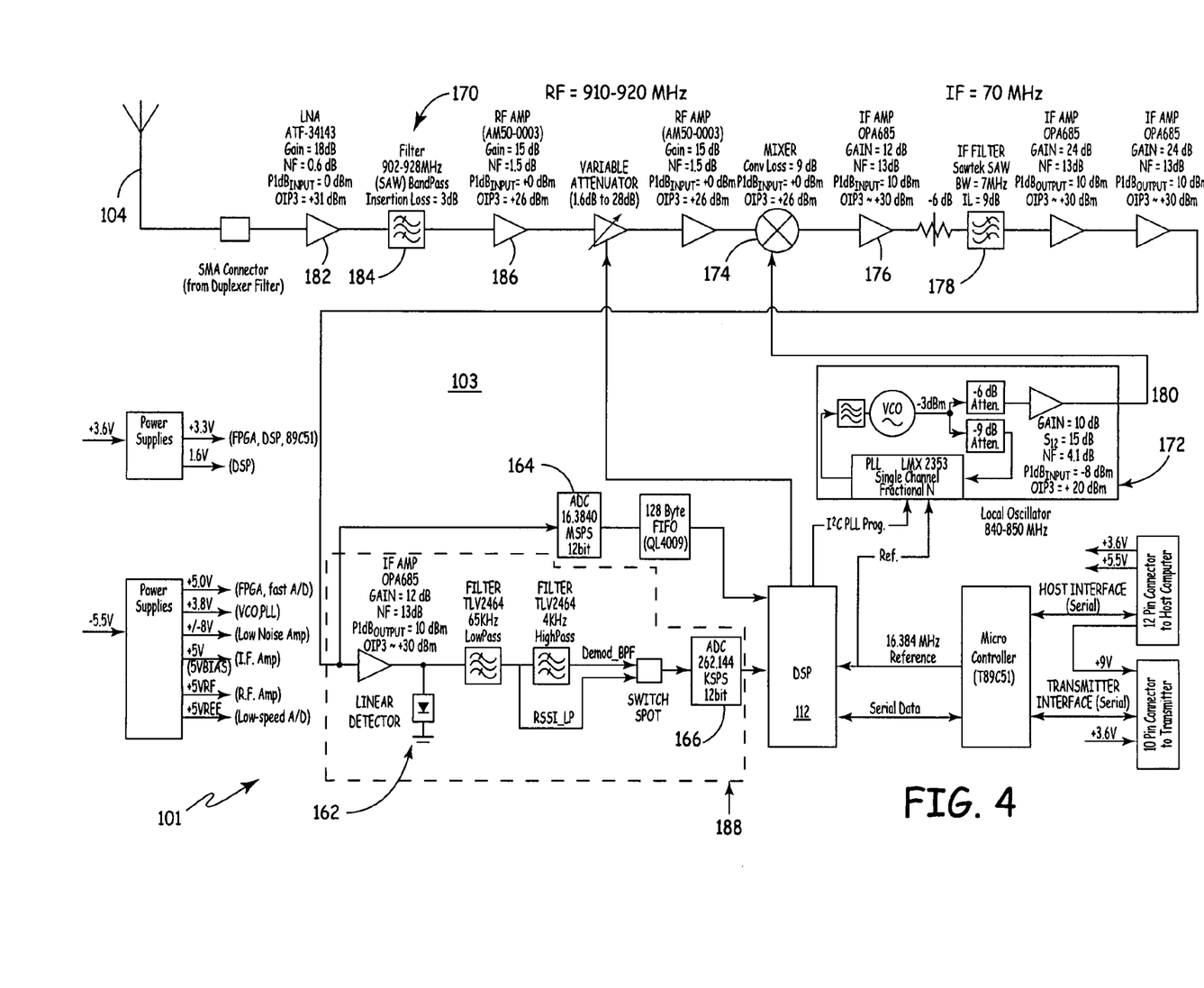
FIG. 4 is a schematic diagram of another embodiment of a receiver module that is configurable to receive frequency modulated signals for the system in FIG. 1.

Referring to FIG. 4, a circuit diagram of a receiver module 101 will be described that is reconfigurable to receive FM signals. The primary components of receiver board 103 of FIG. 4 are linear detector circuitry 162 in electrical communication with analog to digital (A/D) converters 164, 166 connected to DSP 112, an IF frequency generator 172, and a mixer 174 in electrical communication with IF amplifier 176 and filter 178. An RF signal is received by antenna 104 in the range of 910–920 MHZ and IF frequency generator 172 generates a frequency in the range of 840–850 MHZ in one embodiment. To create the IF signal 180, IF frequency generator 172 signal is low-side injected to mixer 174. Following the use of the mixer 174, an IF amplifier 176 and IF filter 178 are utilized to create the 70 MHZ IF signal. This signal is then fed into DSP 112 after passing through high-speed A/D converter 164 and low-speed A/D converter 166. High-speed A/D converter 164 samples the 70 MHZ signal. This is under-sampling the signal, which is the digital equivalent of a mixer. Under-sampling translates the 70 MHZ IF to base band. The samples are then fed into DSP 112, which runs a 64-point fast Fourier transform (FFT); the 64-point FFT creates thirty-two unique frequency bins, each 256 KHZ wide, in this embodiment.

The components of the receiver board 103 of FIG. 4 also include an RF amplifier section 170 that is comprised of a low noise amplifier (LNA) 182 in electrical communication with an RF amplifier 186via a surface acoustic wave filter (SAW) 184. In this embodiment, LNA 182 has an NF of 0.6 db, a P1 dB of 0 dBm, and an IP3 of 31 dBm. RF amplifier 186 has an NF of 1.5 dB, gain of 15 dB, P1 dB of 0 dBm, and IP3 of 26 dBm. Mixer 174 has a CL of +9 dB, a P1 dB of 15 dBm, and IP3 of 0 dBm. IF amplifier 176 has a P1 dB of 10 dBm and IP3 of 30 dB in this embodiment, and IF filter 178 has a bandwidth of 7 MHZ and an IL of 9 dB. High-speed A/D converter 164 is preferably a 12-bit converter operating at a rate of 16.384 MSPS, while the low-speed A/D converter 166 is a 12-bit converter that operates at a rate of 262.144 KSPS in this embodiment.

When the correlator compares a known data pattern with sampled data, the preferred sampling rate is eight times the data rate, in this example 262.144 kHz. This sampling is done by low-speed 12-bit A/D converter 166 electrically coupled to the RSSI (linear detector) 162 of the IF and the DSP 112. When a correlation occurs, the correlator output is synchronized to within one-eighth of a bit. This starts the timing for decoding the rest of the packet from this time. Decoding of the packet uses the center three quarters of each bit and the first one-eighth and the last one-eighth of each bit is discarded due to uncertainty. One particular advantage of this embodiment is that it enables the invention to accomplish effective data sampling at a rate less than the sampling rate dictated by the Nyquist theorem (i.e., sampling must occur at more than twice the effective data transfer rate). In one sense, the correlator effectively allows the decoder to operate as a synchronous power detector for the wideband signal.

In a related example embodiment, the addition of a high-speed A/D converter 164 and a change to a higher performance DSP for a modest cost allows the receiver 101 to decode endpoints as a channelized receiver. A primary requirement for FCC part 15.247 of the receiver hopping in synchronization with the transmitter can be addressed by using a multiple channel radio to ensure decoding an endpoint on any channel. Use of FFT in the disclosed receiver module results in a channelized radio. Where the receiver is FCC part 15.247 compliant high-powered endpoints can be read, thereby increasing the coverage area.

In another embodiment related to the receiver module 101 of FIG. 4, a reconfigured version of module 101 is adapted to operate in a frequency-modulated (FM) signal receiving mode. In desired applications, FM signals can prove more robust and less susceptible to interference. The LCR 100 and reconfigured receiver module 101 of the invention would therefore further improve the coverage area and read reliability in particular applications. In this mode, reconfigured receiver 101 receives FM signals via antenna 104, and decodes FM signals sent from the endpoints. In this reconfigured embodiment, linear detector 162, low-speed A/D converter 166, and associated components 188 are omitted, leaving high-speed A/D converter 164 the only input to DSP 112 when operating in a FM signal receiving mode.

In another example embodiment, a receiver has a sensitivity of around −103 dBm, which is adequate for reading endpoints in a local area, possibly one house deep. Since the receiver is wide band it can be susceptible to interferes, however such susceptibility is reduced by reducing the sensitivity of the receiver and increasing the power of the endpoint. Other approaches include reducing the sensitivity and accepting a reduced coverage range or adding some cost by increasing the filtering to the RF front end.

The present invention may be embodied in other specific forms without departing from the spirit of the essential attributes thereof, therefore, the illustrated embodiments should be considered in all respects as illustrative and not restrictive, reference being made to the appended claims rather than to the foregoing description to indicate the scope of the invention.

We claim:

1. A low cost receiver (LCR) module for use in an automatic meter reading (AMR) system, the LCR module comprising:
   a receiver board;
   an antenna mounted on the receiver board for receiving wireless signals;
   at least one processor communicatively coupled to the antenna and mounted on the receiver board; and
   a decoder circuit in electrical communication with the antenna and mounted on the receiver board, wherein the decoder circuit comprises a low noise amplifier circuit electrically coupled to a filter circuit, a variable attenuation circuit, and to a linear detector, wherein the decoder circuit operates without a local oscillator and is operable to pass received signals to the at least one processor from the antenna.

2. The LCR module of claim 1, wherein the decoder circuit further comprises a fast Fourier transform (FFT) engine.

3. The LCR module of claim 1, wherein the at least one processor includes a microcontroller and a signal processor, wherein the microcontroller directs data and commands to and from the signal processor.

4. The LCR module of claim 1, wherein the at least one processor further includes a host computer interface adapted for communicative coupling with a host computer; and
   wherein the at least one processor includes a microcontroller that directs data to and from the host computer via the host computer interface.

5. The LCR module of claim 1, wherein the signal processor comprises a digital signal processor (DSP).

6. The LCR module of claim 5, wherein the DSP further comprises a correlator programmed to detect and compare data.

7. The LCR module of claim 6, wherein the wireless signals comprise frequency modulated signals, and wherein the LCR further comprises a high-speed analog-to-digital converter operable to feed signals to the DSP from the decoder circuit.

8. A receiver module for use in an automatic meter reading (AMR) system, the receiver module comprising:
   a receiver board;
   an antenna adapted to receive wireless signals;
   at least one processor communicatively coupled to the antenna and mounted on the receiver board; and
   a decoder circuit in electrical communication with the antenna and mounted on the receiver board, wherein the decoder circuit and comprises a low noise amplifier circuit electrically coupled to a filter circuit, a variable attenuation circuit, and to a first analog-to-digital (A/D) converter, wherein the decoder circuit operates without a mixer and is operable to pass received signals to the at least one processor from the antenna.

9. The receiver module of claim 8, wherein the at least one processor comprises a digital signal processor (DSP).

10. The receiver module of claim 8, further comprising a linear detector circuit coupled to a second A/D converter, wherein the first A/D converter comprises a low-speed A/D converter in electrical communication with the linear detector circuit to feed the at least one processor, and wherein the second A/D converter comprises a high-speed A/D converter electrically coupled to the at least one processor.

11. The receiver module of claim 8, wherein the first A/D converter comprises a high-speed A/D converter, and wherein the RF signals comprise frequency modulated signals.

12. The receiver module of claim 8, wherein the at least one processor and the first A/D converter collectively perform an operation that is a digital equivalent to mixing.

13. The receiver module of claim 8, wherein the at least one processor further includes a host computer interface adapted for communicative coupling with a host computer that is programmed to process utility meter endpoint information received by the receiver module.

14. The receiver module of claim 8, further comprising:
a linear detector circuit in electrical communication with the decoder circuit, wherein the linear detector circuit is selectively utilized for detecting an amplitude modulated (AM) signal.

\* \* \* \* \*